(12) United States Patent
Juilland et al.

(10) Patent No.: US 11,780,738 B2
(45) Date of Patent: Oct. 10, 2023

(54) PRODUCTION OF CALCIUM HYDROXIDE NANOPARTICLES AND THEIR USE AS ACCELERATORS IN MINERAL BINDER COMPOSITIONS

(71) Applicant: SIKA TECHNOLOGY AG, Baar (CH)

(72) Inventors: Patrick Juilland, Bern (CH); Emmanuel Gallucci, Zürich (CH); Denise Schönenberger, Kollbrunn (CH); Luis Pegado, Brugg (CH); Lukas Frunz, Dietlikon (CH); Arnd Eberhardt, Winterthur (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 16/976,704

(22) PCT Filed: Mar. 22, 2019

(86) PCT No.: PCT/EP2019/057201
§ 371 (c)(1),
(2) Date: Aug. 28, 2020

(87) PCT Pub. No.: WO2019/180191
PCT Pub. Date: Sep. 26, 2019

(65) Prior Publication Data
US 2021/0053837 A1    Feb. 25, 2021

(30) Foreign Application Priority Data
Mar. 22, 2018 (EP) .................................. 18163482

(51) Int. Cl.
*C01F 11/02* (2006.01)
*C04B 40/00* (2006.01)
(Continued)

(52) U.S. Cl.
CPC ............ *C01F 11/02* (2013.01); *C04B 22/064* (2013.01); *C04B 24/2647* (2013.01);
(Continued)

(58) Field of Classification Search
CPC ... C04B 22/064; C04B 20/008; C04B 22/085; C04B 22/16; C04B 40/0039;
(Continued)

(56) References Cited

U.S. PATENT DOCUMENTS

2011/0269875 A1* 11/2011 Nicoleau ................. C04B 28/02
524/2
2017/0073267 A1    3/2017 Gallucci et al.

FOREIGN PATENT DOCUMENTS

CN    104781206 A    7/2015
CN    106133015 A    11/2016
(Continued)

OTHER PUBLICATIONS

WO2010/001965 Translation 2010.*
(Continued)

*Primary Examiner* — Shuangyi Abu Ali
(74) *Attorney, Agent, or Firm* — Oliff PLC (57) ABSTRACT

An aqueous suspension including 5 to 65 wt. % of calcium hydroxide, wherein at least 50 wt. % of the calcium hydroxide is present in the form of nanoparticles, and at least one compound for stabilizing the suspension. The aqueous suspension accelerates the setting of mineral binder compositions without adversely affecting the processing properties of the composition.

15 Claims, 1 Drawing Sheet

(51) Int. Cl.
*C04B 22/06* (2006.01)
*C04B 24/26* (2006.01)
*B82Y 40/00* (2011.01)
*C04B 103/12* (2006.01)

(52) U.S. Cl.
CPC ........... *C04B 40/0039* (2013.01); *B82Y 40/00* (2013.01); *C01P 2004/51* (2013.01); *C01P 2004/62* (2013.01); *C01P 2006/22* (2013.01); *C04B 2103/12* (2013.01)

(58) Field of Classification Search
CPC ... C04B 22/124; C04B 24/04; C04B 24/2647; C04B 28/02; C04B 2103/006; C04B 24/165; C04B 24/246; C04B 24/2658; C04B 2103/10; C04B 2103/12; B82Y 40/00; C01F 11/02; C01P 2004/51; C01P 2004/62; C01P 2006/22
See application file for complete search history.

(56) References Cited

FOREIGN PATENT DOCUMENTS

| EP | 1138697 B1 * | 11/2003 | ......... C04B 24/2647 |
| EP | 1 719 742 A1 | 11/2006 | |
| EP | 2 500 328 A1 | 9/2012 | |
| JP | 2010-184841 A | 8/2010 | |
| WO | 2008/034616 A1 | 3/2008 | |
| WO | 2010/001965 A1 | 1/2010 | |
| WO | 2010/026155 A1 | 3/2010 | |
| WO | 2015/144886 A1 | 10/2015 | |
| WO | 2017/050907 A1 | 3/2017 | |

OTHER PUBLICATIONS

Sodium Hydroxide for pH Neutralization to Digital analysis corporation. part I (Year: 2008).*
Sodium Hydroxide for pH Neutralization to Digital analysis corporation. part II (Year: 2008).*
Rodriguez-Navarro et al., "Alcohol Dispersions of Calcium Hydroxide Nanoparticles for Stone Conservation," Langmuir, 2013, vol. 29, pp. 11457-11470.
Daniele et al., "The nanolimes in Cultural Heritage conservation: Characterisation and analysis of the carbonation process," Journal of Cultural Heritage, 2008, vol. 9, pp. 294-301.
Daniele et al., "Nanolime suspensions applied on natural lithotypes: the influence of concentration and residual water content on carbonation process and on treatment effectiveness," Journal of Cultural Heritage, 2010, vol. 11, pp. 102-106.
Jul. 1, 2019 International Search Report issued in International Patent Application No. PCT/EP2019/057201.
Arizzi, A. et al. "Lime mortar consolidation with nanostructured calcium hydroxide dispersions: the efficacy of different consolidating products for heritage conservation". Eur. J. Mineral, 27, pp. 311-323, Feb. 27, 2015.
Carretti, E. et al. "Interactions between Nanostructured Calcium Hydroxide and Acrylate Copolymers: Implications in Cultural Heritage Conservation". American Chemical Society, Langmuir, 29, pp. 9881-9890, 2013.

* cited by examiner

PRODUCTION OF CALCIUM HYDROXIDE NANOPARTICLES AND THEIR USE AS ACCELERATORS IN MINERAL BINDER COMPOSITIONS

TECHNICAL FIELD

The invention relates to an aqueous suspension of calcium hydroxide nanoparticles, to a method for producing it, and to the use of the suspension as an accelerator for mineral binder compositions.

PRIOR ART

Cement is a mineral binder and is used primarily for concrete and mortar. When cement is mixed with water, it cures in a chemical process, called cement hydration. Cement hydration, also referred to as the setting of the cement, produces cement hydrates. These hydrates function as binders for the aggregates in concrete and mortar—typically sand, gravel, and stones—to form a solid article. Cement hydration is an exothermic process in which the strength-developing reaction typically begins only with a delay, often only several hours after the mixing of the cement with water.

There are many applications of mortar or concrete in which rapid setting and a rapid development of strength are very important, owing to the consequent gain in time and hence cost savings.

There are various methods of accelerating cement hydration. An increase in the temperature accelerates the setting and is employed, in factories producing ready-made parts, through the heating of formwork elements and aggregates and/or through the use of hot water. This technology results in increased costs and the possibilities for its use outside the ready-made part production factories are limited. Another possible way of accelerating cement hydration is to add water-soluble salts, such as calcium chloride, calcium nitrite or sodium nitrite, for example, and/or amines, such as hydroxyalkylamines, for example. There are, however, limits on their accelerating effect and/or restrictions on their use. Calcium chloride leads to steel corrosion in reinforced concrete; nitrites and amines are hazardous to health; and amines may interfere with concreting work as a result of an unpleasant odor.

The water-soluble accelerators of the prior art have the disadvantage, moreover, that the mortar or concrete mixtures accelerated using them undergo rapid stiffening, meaning that they rapidly lose their effective workability. The mortar or concrete mixtures thus accelerated must be processed usually within an hour or less, something which is often not possible, especially in the case of long transport times for the fresh mortar or fresh concrete.

Another possible way described for accelerating the setting of cement is to add fine inorganic powders.

EP 1719742 describes the use of calcium hydroxide powder having a specific BET surface area of 25 $m^2/g$ or more as an accelerator component in a hydraulic binder.

WO 2008/034616 describes the addition of calcium hydroxide powder having a BET surface area of 7 to 16 $m^2/g$ or an average particle size of 4.5 to 7 μm for accelerating a hydraulic binder composition.

The handling of powders typically entails dusting, especially if the powder is very fine. The alkaline calcium hydroxide powder can easily cause damage to eyes, airways, and skin of those individuals working with it.

Consequently there continues to be a need for a highly effective accelerator for mineral binder compositions, especially for cementitious compositions, that as far as possible overcomes the disadvantages stated.

SUMMARY OF THE INVENTION

It is an object of the present invention, therefore, to provide an accelerator for mineral binder compositions, especially for cementitious binder compositions, such as mortar or concrete, for example, which has good handling qualities, is highly effective and storage-stable, is simple and quick to produce, and ensures a sufficiently long working time.

Surprisingly the object is achieved by means of an aqueous suspension as described in claim 1.

The aqueous suspension is easy to meter and does not form dusts which are harmful to health.

The suspension of the invention, surprisingly, results in extremely effective acceleration of the hydration reaction of cement and cementitious compositions. It shortens the so-called rest period, this being the time between the mixing of the cement with water and the onset of the exothermic hydration reaction, and it accelerates the hydration reaction itself.

Additionally, in reinforced concrete or in prestressed concrete, for example, the calcium hydroxide protects the reinforcing iron from rapid corrosion.

Although suspensions of solids have the tendency to form agglomerates and to undergo sedimentation, with possible adverse consequences for the storage stability and the accelerator effect, the suspension of the invention, surprisingly, is highly storage-stable and shows no tendency toward sedimentation.

When added to a mortar or concrete mixture, the suspension surprisingly ensures both a long working time and a high degree of acceleration of the development of strength, which is a great advantage.

Further aspects of the invention are subjects of further independent claims. Particularly preferred embodiments of the invention are subjects of the dependent claims.

EMBODIMENTS OF THE INVENTION

A subject of the invention is an aqueous suspension comprising
- 5 to 65 weight % of calcium hydroxide, at least 50 weight % of the calcium hydroxide being in the form of nanoparticles, and
- at least one compound for stabilizing the suspension.

A "compound for stabilizing the suspension" in the present document means a compound which reduces or prevents the sedimentation of the calcium hydroxide in the suspension.

An "aqueous suspension" in the present document means a suspension in which the liquid phase comprises water. Specifically the liquid phase apart from water comprises no other solvents such as alcohols, glycols or ketones, for example.

Nanoparticles are particles whose size lies in the nano range. These ultrafine particles are notable for a very high specific surface area and consequently for specific properties.

"Nanoparticles" in the present document refer to particles which have a size of below 1 μm.

The "particle size" in the present document means the diameter of the particles. The "D50" in the present document is the particle size value at which 50 weight % of the particles are smaller and 50 weight % of the particles are larger than this value.

The "D10" indicates the particle size value at which 10 weight % of the particles are smaller than this value.

The "D90" indicates the particle size value at which 90 weight % of the particles are smaller than this value.

A "mineral binder" in the present document means in particular a binder which in the presence of water reacts in a hydration reaction to give solid hydrates or hydrate phases.

A "mineral binder composition" in the present document means, correspondingly, a composition comprising at least one mineral binder. This composition includes more particularly the binder, fillers, and optionally one or more admixtures.

A "cementitious binder" in the present document means in particular a binder having a fraction of at least 5 weight %, more particularly at least 20 weight %, preferably at least 35 weight %, especially at least 65 weight %, with a maximum content of 100 weight %, of cement clinker. The cement clinker preferably comprises a Portland cement clinker, a calcium aluminate clinker or a calcium sulfoaluminate clinker. Cement clinker in the present document refers more particularly to ground cement clinker.

A "cementitious composition" in the present document means, correspondingly, a composition comprising at least one cementitious binder. This composition includes, in particular, the binder, fillers, and optionally one or more admixtures.

"Mortar" or "concrete" in the present document means aqueous dispersions which comprise at least one cement and at least one mineral filler and which are capable, after the hydration of the cement, of curing in a solid shape. A "mortar" in this context means dispersions which comprise fillers having particle sizes of typically up to a maximum of about 8 mm, and, "concrete" means dispersions which also comprise fillers having particle sizes above 8 mm.

"(Meth)acrylic acid" in the present document means both methacrylic acid and acrylic acid, and this also applies correspondingly to (meth)acrylates and other compounds of (meth)acrylic acid.

In the present document, the particle size of the calcium hydroxide particles has been determined using two different instruments.

With the HELOS instrument equipped with the Quixel dispersing unit, both from Sympatec, Germany, the particle size of the calcium hydroxide suspensions was determined by laser diffraction. In this case the suspensions were diluted with saturated calcium hydroxide solution. This measurement captures particle sizes of 0.10 to 8750 μm in the suspension.

For the size determination of the nanoparticles, the Nanophox instrument from Sympatec, Germany, was used. In this case the particle size is determined by dynamic light scattering with photon cross-correlation spectroscopy. The instrument captures particle sizes from 0.5 to 10 000 nm.

The calcium hydroxide is preferably present in the aqueous suspension to an extent of at least 65 weight %, more preferably at least 75 weight %, more particularly at least 85 weight %, in the form of nanoparticles.

The calcium hydroxide nanoparticles advantageously have a particle size of below 950 nm, preferably from 10 to 800 nm, more preferably from 20 to 500 nm, most preferably from 30 to 400 nm, more particularly from 40 to 300 nm, especially from 50 to 200 nm, and/or have a D90 of below 800 nm, preferably below 600 nm, more particularly below 400 nm, especially below 200 nm, measured by dynamic light scattering with photon cross-correlation spectroscopy as description in ISO 22412:2017.

Suspensions which comprise calcium hydroxide particles having such dimensions are particularly storage-stable and very effective in the acceleration of mineral binder compositions, especially of cementitious compositions.

The storage stability of the suspension is determined preferably by centrifuging and measuring the turbidity of the solution, as described in the examples. The more turbid the upper phase after centrifuging, the fewer the number of particles which have settled and the more stable the suspension. The turbidity is determined advantageously with a turbidimeter and reported in NTU. NTU denotes Nephelometric Turbidity Unit. The higher this value, the greater the turbidity of the sample and the more stable the suspension.

Advantageously, the aqueous suspension, if it has a calcium hydroxide content of 10 weight %, has a turbidity, after the centrifuging of 50 ml of this suspension in a 50 ml centrifuge tube over 15 minutes at 8000 revolutions per minute, and removal of the top 40 ml for the turbidity measurement, of above 3000 NTU, preferably above 4000 NTU, more preferably above 5000 NTU, more particularly above 6000 NTU, especially above 7000 or above 8000 NTU, measured with a HACH® 2100AN turbidimeter.

The suspension may further comprise an alkali metal salt. The alkali metal salt may be added to the calcium hydroxide suspension and dissolved therein. Alternatively, the alkali metal salt may come about during the preparation of the calcium hydroxide by precipitation reaction from a water-soluble calcium salt and an alkali metal hydroxide.

The aqueous suspension preferably comprises 0.01 to 2.5 mol, preferably 0.1 to 2.2 mol, of an alkali metal salt, more particularly of a sodium, potassium or lithium salt, preferably a sodium salt, of nitrate, chloride, acetate, formate or thiocyanate, or mixtures thereof, based on 1 mol of calcium hydroxide. This is able to bring about especially good acceleration.

For certain applications, especially as accelerators in cementitious compositions with steel reinforcement, it is advantageous if the alkali metal salt comprises no chloride. Chlorides promote the corrosion of construction steel and may therefore be detrimental to the longevity of a reinforced component.

Most preferably the alkali metal salt is sodium nitrate or potassium nitrate, more particularly sodium nitrate.

In a further advantageous embodiment of the invention, the suspension, as well as the calcium hydroxide, may further comprise very fine calcium carbonate and/or CSH particles, more particularly in the form of nanoparticles. The fraction of calcium carbonate and/or CSH particles is preferably 0.01 to 50 weight %, more particularly 0.05 to 30 weight %, based on the weight of the calcium hydroxide. This may be advantageous for the accelerating effect.

CSH here stands for calcium silicate hydrate.

Advantageously the suspension includes no calcium sulphate.

The suspension comprises at least one compound for stabilization. This compound surprisingly brings about very good stability of the calcium hydroxide particles, and more particularly it reduces and/or prevents the agglomeration of the particles. As a result, the calcium hydroxide particles remain very small, with a particle size in the nano range, and therefore have very little or no tendency toward sedimentation, hence enabling a very fine, highly storage-stable suspension with a high fraction of nanoparticles.

The compound for stabilizing the suspension is preferably an anionic polymer comprising carboxylate groups, sulfate groups, sulfonate groups, phosphate groups or phosphonate groups, or mixtures thereof, or salts thereof.

The anionic polymer is more particularly a chain addition polymer or a polycondensate. The anionic polymer is preferably soluble in water at a pH of 12.0, more preferably at a pH of 7, more particularly at a pH of 4, or below.

The anionic polymer preferably also acts as a plasticizer for mineral binder compositions, especially for cementitious compositions.

Examples of suitable anionic polymers include ligno-sulfonates, sulfonated naphthalene-formaldehyde condensates, sulfonated melamine-formaldehyde condensates, sulfonated vinyl copolymers, poly(meth)acrylic acid, copolymers of (meth)acrylic acid with (meth)acrylic acid esters or hydroxyalkyl (meth)acrylates, polyalkylene glycols having phosphonate groups, polyalkylene glycols having phosphate groups, comb polymers having anionic groups and polyether side chains, or salts thereof, or mixtures of the stated polymers.

The compound for stabilizing the suspension preferably comprises polyalkylene oxide units, more particularly polyethylene oxide units.

The anionic polymer is advantageously stable in the aqueous suspension. Advantageously it has no groups, more particularly no side-chain linkages, which undergo hydrolysis at a high pH, especially above 12.0.

The anionic polymer is more particularly a comb polymer comprising a polymer backbone having polyalkylene oxide side chains and anionic groups bonded to the backbone. The side chains here are bonded to the polycarboxylate backbone in particular by way of ester, ether, imide and/or amide groups.

The compound for stabilizing the suspension is preferably a comb polymer which comprises the structural units (i) of the formula I and structural units (ii) of the formula II, where
$R^1$, in each case independently of one another, is —COOM, —$SO_2$—OM, —O—$PO(OM)_2$, —$PO(OM)_2$, —(CO)—NH—$C(CH_3)_2$—$CH_2$—$SO_3M$, —$CH_2$—$SO_3M$, and/or $R^2$, in each case independently of one another, is H, —$CH_2COOM$ or an alkyl group having 1 to 5 carbon atoms,
$R^3$, $R^5$ and $R^6$, in each case independently of one another, are H or an alkyl group having 1 to 5 carbon atoms,
$R^4$ and $R^7$, in each case independently of one another, are H, —COOM or an alkyl group having 1 to 5 carbon atoms,
M, independently of one another, represents $H^+$, an alkali metal ion or an alkaline earth metal ion;
m is 0, 1 or 2,
p is 0 or 1,
X, in each case independently of one another, is —O—, NH— or —$NR^8$—,
$R^8$ is a group of the formula -$[AO]_n$—$R^a$,
where A=$C_2$ to $C_4$ alkylene and $R^a$ is H or a $C_1$ to $C_{20}$ alkyl, cyclohexyl or alkylaryl group,
and n is 1 to 250.

Especially preferred are comb polymers comprising structural unit (i) and structural unit (ii) wherein
$R^1$ is —COOM,
$R^2$ and $R^5$, in each case independently of one another, are H or $CH_3$,
$R^3$, $R^6$ and $R^7$ are H,
$R^4$, in each case independently of one another, is H or —COOM,
M, in each case independently of one another, represents $H^+$, an alkali metal ion or an alkaline earth metal ion;
m is 0, 1 or 2,
p is 0 or 1,
X, in each case independently of one another, is —O— or —NH—,
$R^8$ is a group of the formula -$[AO]_n$—$R^a$,
where A=$C_2$ to $C_3$ alkylene, preferably $C_2$ alkylene, and $R^a$ is H or $C_1$ to $C_4$ alkyl group, and
n is 10-200, preferably 22-150, more particularly 50-120.

Particularly advantageous are comb polymers in which structural unit (i) derives from acrylic acid or methacrylic acid, and in which the structural unit (ii) derives from a polyethylene glycol methacrylate or from an alkenyl-polyethylene glycol ether having 2 to 5 carbon atoms in the alkenyl group and the polyethylene glycol chain has 10 to 150, preferably 22 to 120, ethylene glycol units.

Advantageously the comb polymer consists exclusively of structural units (i) and (ii).

The molar ratio of structural unit (i) to structural unit (ii) is preferably 1:1 to 25:1, more preferably 1.5:1 to 23:1, more preferably still 2:1 to 20:1, more particularly 2.3:1 to 18:1.

It may, however, also be advantageous if the comb polymer comprises further structural units (iii), with the structural units (iii) being different from the structural units (i) and (ii). Advantageous further structural units preferably derive from (meth)acrylic acid alkyl esters, hydroxyalkyl (meth)acrylates, N-vinylpyrrolidone, vinyl esters, styrene, monoamides of maleic acid with sulfanilic acid or with alkylamines, especially hydroxyethyl acrylate and hydroxypropyl acrylate.

Structural unit (iii) is present advantageously in 0 to 70 weight %, preferably 0.1 to 50 weight %, more particularly 0.5 to 40 weight % in the comb polymer.

The fraction of hydrophobic structural units in the anionic polymer is preferably below 50 mol %, more particularly below 30 mol %, especially below 10 mol %. A hydrophobic structural unit in this context derives from a monomer which is insoluble or very poorly soluble in water.

The anionic polymer, more particularly the comb polymer, is preferably composed exclusively of highly water-soluble structural units.

The comb polymer preferably has a fraction of 1.5 to 6, more preferably 1.8 to 5, more particularly 2.0 to 4, especially 2.2 to 3.5, mmol of anionic functions per g of polymer, with a phosphate or phosphonate group having an anionic functionality of 2.

Comb polymers having such a structure are especially suitable for stabilizing the suspension and preventing agglomeration of the particles, so producing very fine and stable suspensions. At the same time they are outstandingly suitable for plasticizing mineral binder compositions, especially cementitious compositions, which are accelerated using the suspension, and for ensuring the high workability of these compositions over a long period, without excessively influencing the desired rapid development of strength.

The comb polymer preferably has an average molecular weight $M_w$ of 8000 to 150 000, more preferably of 9000 to 120 000, more particularly 10 000 to 100 000, especially 11 000 to 80 000.

The molecular weight, such as the weight-average molecular weight $M_w$ or the number-average molecular weight $M_n$ is determined here by gel permeation chromatography (GPC) with polyethylene glycol as standard. The eluent used is a 0.1N $NaNO_3$ solution whose pH has been adjusted to 12 using NaOH.

This technique is known per se to the person skilled in the art.

Suitable methods of preparation for comb polymers are a free radical copolymerization of the corresponding monomers or a polymer-analogous esterification or amidation of polymers which comprise carboxyl groups with polyalkylene glycols or polyalkylene glycol amines which are capped at one end.

Advantageous comb polymers can also be prepared via "living radical polymerization" of suitable monomers. Especially advantageous are comb polymers having a block or a gradient structure. Exemplary suitable polymers and also their preparation are described in WO2015/144886 and WO 2017/050907.

The compound for stabilizing the suspension is present preferably in 5 to 40 parts, more preferably 8 to 35 parts, even more preferably 10 to 32 parts, very preferably 11 to 30 parts, calculated as solid, based on 100 parts of calcium hydroxide, in the aqueous suspension.

An amount of this kind produces very effective dispersing of the calcium hydroxide particles and a high storage stability of the suspension.

Surprisingly it has emerged that the stability of the suspension is even better if the pH of the aqueous suspension is increased. This is achieved advantageously by adding alkali metal hydroxide during or after the production of the suspension. The pH of the suspension is advantageously above 12.0 and below 13.8, measured at 24° C.

A particularly suitable aqueous suspension comprises
    8 to 15 weight % of calcium hydroxide, at least 50 weight %, preferably at least 65 weight %, of the calcium hydroxide being in the form of nanoparticles,
    15 to 25 weight % of alkali metal salt, more particularly $NaNO_3$, and
    0.8 to 3 weight % of comb polymer,
    based on 100 weight % of the aqueous suspension.

The suspension may advantageously further comprise at least one further additive, more particularly a thickener, preferably based on a natural or synthetic polymer, and/or a defoamer.

The suspension contains less than 0.1 weight %, preferably less than 0.01 weight %, based on the total weight of the suspension, of methanol, ethanol, n-propanol, isopropanol, n-butanol, glycols such as, for example, ethylene glycols, glycerol, ketones and/or of sugar alcohols such as, for example, xylitol, sorbitol and erythritol. Such alcohols have a retarding effect on the setting of mineral binder compositions, especially cementitious compositions, and are therefore less desirable in a setting accelerator.

A further subject of the invention is a method for producing an aqueous suspension comprising
    5 to 65 weight % of calcium hydroxide, at least 50 weight % of the calcium hydroxide being in the form of nanoparticles, and
    at least one compound for stabilizing the suspension.

The aqueous suspension is preferably produced by reacting a water-soluble calcium salt with an alkali metal hydroxide, where the compound for stabilizing the suspension is present during the reaction or is added after the reaction.

More particularly the water-soluble calcium salt is selected from the group encompassing calcium nitrate, calcium chloride, calcium acetate, calcium formate and calcium thiocyanate and a mixture thereof.

For certain applications it is advantageous if the water-soluble calcium salt is not a chloride. Chlorides promote the corrosion of, for example, reinforcing iron in concrete.

The alkali metal hydroxide is preferably sodium hydroxide or potassium hydroxide. More particularly the molar ratio of calcium salt to alkali metal hydroxide is 1.0:2.0 to 2.4, preferably 1.0:2.02 to 2.3.

The reaction takes place preferably in water or in a mixture of water and a water-miscible solvent, more particularly an alcohol, most preferably in pure water. Alcohols, especially methanol, ethanol, or 2-propanol, are combustible liquids and therefore necessitate explosion-secured devices when producing the suspension, so increasing costs. Organic solvents, especially alcohols, glycols or ketones, may also retard or even prevent the setting of cementitious binders.

Especially preferably, therefore, the aqueous suspension is free from organic solvents, especially alcohols, glycols, more particularly ethylene glycol or propylene glycol, or ketones.

Water with a low dissolved $CO_2$ content is preferably used.

In one advantageous embodiment the reaction is carried out under inert gas or low-$CO_2$ air.

This reduces the formation of calcium carbonate.

The aqueous suspension is advantageously produced by the following steps:
    (a) providing an aqueous solution A comprising a water-soluble calcium salt, more particularly calcium nitrate, calcium chloride, calcium acetate, calcium formate, calcium thiocyanate or a mixture thereof, preferably with at least 5 weight %, more preferably at least 15 weight %, more particularly at least 20 weight %, of calcium salt,
    (b) providing an aqueous solution B comprising an alkali metal hydroxide, preferably NaOH, KOH or a mixture thereof, preferably with at least 5 weight %, more preferably at least 10 weight %, more particularly at least 18 weight %, of alkali metal hydroxide,
    (c) contacting solution A and solution B, the two solutions being mixed very rapidly and intensely, preferably continuously, and (d) discharging the resulting suspension from the reaction vessel or the continuous reactor, where a compound for stabilizing the suspension is added to the solution A, to the solution B or to both solutions, or to the suspension produced.

The compound for stabilizing the suspension is present preferably in solution A and/or solution B, especially entirely in solution A.

The preferred compounds for stabilizing the suspension have already been described above.

Solution A contains preferably 10 to 87 weight %, more preferably 15 to 85 weight %, very preferably 20 to 80 weight % of calcium salt. The calcium salt present in solution A is preferably calcium nitrate, more particularly calcium nitrate tetrahydrate. Calcium nitrate tetrahydrate has particularly high water solubility, which is advantageous for the reaction.

Solution B contains preferably 10 to 50 weight %, more preferably 20 to 40 weight %, of alkali metal hydroxide, more particularly sodium hydroxide.

In one preferred embodiment of the present invention, solution A and solution B are metered simultaneously into a reaction vessel or a continuous reactor, in which they are intensely mixed. The manner in which the solutions are metered is preferably such that the molar ratio of calcium salt to alkali metal hydroxide, 1:2.0 to 2.4, preferably 1:2.02 to 2.3, is largely observed throughout the metering period.

The intense mixing takes place preferably in a continuous reactor.

Preferably solution A and solution B are metered very rapidly, advantageously under pressure, into the continuous reactor, preferably by means of pumps.

Preferably solution A and solution B are metered each under a pressure of at least 5 bar, more particularly at least 8 bar, especially at least 10 bar into the continuous reactor. The pressure may more particularly be up to 50 bar or more. The continuous reactor is preferably not itself under pressure, or has a pressure of not more than 0.5 bar in the reaction compartment. "Pressure" here means the pressure difference relative to an external pressure, in other words the ambient air pressure.

The high pressure and the resultant high velocity of the solutions on introduction into the reactor produces an intense swirling of the two solutions and hence a rapid and intense mixing.

In particular, the mixing energy with which solution A and solution B are mixed is not more than 200 kJ, preferably 150 kJ, especially 100 kJ, in particular below 70 kJ, per kilogram of calcium hydroxide suspension produced.

The continuous reactor is preferably a tubular reactor. There may also be static and/or dynamic mixing elements present in the reactor.

The reaction time is preferably very short.

The rapid and intense mixing of the two solutions takes place preferably continuously and the mixing time is preferably below 1 minute, more preferably below 30 seconds, more particularly below 10 seconds, especially below 1 second.

Such a method is simple and quick and, surprisingly, calcium hydroxide nanoparticles having a narrow particle size distribution are obtained.

In a further preferred embodiment of the invention, the aqueous suspension, in order to increase the solids content, may also be concentrated by suitable means, in particular by removal of some of the water, by evaporation, for example.

As a result, the suspension can be used in a smaller added amount, and costs of transportation and of storage can be reduced.

The aqueous suspension of calcium hydroxide particles may optionally be cleaned to remove auxiliaries or byproducts which have been used or come about in the course of production. This may be done in particular by means of ion exchange, filtration or ultrafiltration.

Preferably both the production of the suspension and the cleaning and/or concentrating take place continuously, preferably in directly successive steps. This saves time and costs.

The suspension of the invention can be used for various purposes, as for example for neutralizing acidic solutions or as an accelerator for mineral binder compositions.

The aqueous suspension is preferably used to accelerate the setting of a mineral binder composition, especially of a cementitious composition.

The mineral binder composition preferably further comprises aggregates.

The mineral binder composition is preferably a mortar or concrete.

The aqueous suspension is outstandingly suitable for accelerating the setting of mineral binders, especially of cement, thereby achieving high strengths rapidly, which is very desirable.

Suitable cement encompasses all common cements, particularly the following cements classified under DIN EN 197-1: Portland cement (CEM I), Portland composite cement (CEM II), blast furnace slag cement (CEM III), pozzolanic cement (CEM IV), and composite cement (CEM V), and also specialty cements such as, for example, calcium aluminate cement or calcium sulfoaluminate cement. Cements produced according to an alternative standard, such as the ASTM standard or the JIS standard, for example, are of course equally suitable.

The aqueous suspension is metered advantageously in an amount such that in the mineral binder composition there is 0.05 to 6 weight %, more preferably 0.1 to 5 weight %, more particularly 0.2 to 4 weight % of calcium hydroxide particles, based on the weight of the mineral binder.

An amount of this kind produces effective acceleration of setting.

The aqueous suspension of the invention does not only shorten the rest period, that being the time between the mixing of cement with water and the onset of the exothermic hydration reaction, also called the start of setting; instead, it also accelerates the hydration reaction itself.

This is particularly important for applications at relatively low temperature, especially below 20° C. or below 15° C., since at a low temperature the rest period is prolonged and the hydration reaction of cement is severely slowed.

As a result of this acceleration, surprisingly, the good workability of the cementitious composition is not affected and also the working life is not curtailed. This means that a mortar or concrete mixture comprising the aqueous suspension, both immediately and after 60 or 90 minutes, has a slump comparable with that of a concrete or mortar mixture without the aqueous suspension, for the same w/c. The w/c here indicates the weight ratio of water to cement.

The suspension of the invention is especially advantageous for use in ready-mix concrete, since the working life is unaffected and nevertheless high strength is rapidly achieved.

The cementitious composition preferably further comprises at least one additive, as for example a concrete admixture and/or a mortar admixture. The at least one additive embraces more particularly a defoamer, a wetting agent, a dye, a preservative, a plasticizer, a retarder, another accelerator, a polymer, an air entrainer, a rheological aid, a viscosity modifier, a pumping aid, a shrinkage reducer, a corrosion inhibitor or fibers, or combinations thereof.

Such admixtures are known to the person skilled in the art.

The suspension is added preferably to the mineral binder composition, especially to the cementitious composition, together with the mixing water or after the mixing water.

The suspension is preferably mixed with the composition in a suitable mixing vessel with a mechanical mixer for at least 20 seconds, thoroughly.

This ensures uniform distribution of the calcium hydroxide particles in the mixture and a good, uniform effect as accelerator.

A further subject of the present invention is a mineral binder composition, especially a cementitious binder composition, comprising the aqueous suspension of the invention.

A further subject of the present invention pertains to a shaped article obtainable by curing the mineral binder composition, especially a cementitious binder composition, as described above.

The shaped article is preferably an edifice or part of an edifice, where an edifice may be, for example, a bridge, a building, a tunnel, a trafficway, or a runway.

Further advantageous embodiments of the invention are apparent from the working examples which follow.

BRIEF DESCRIPTION OF THE DRAWING

FIG. 1 is used to illustrate the working examples.

Figure 1:
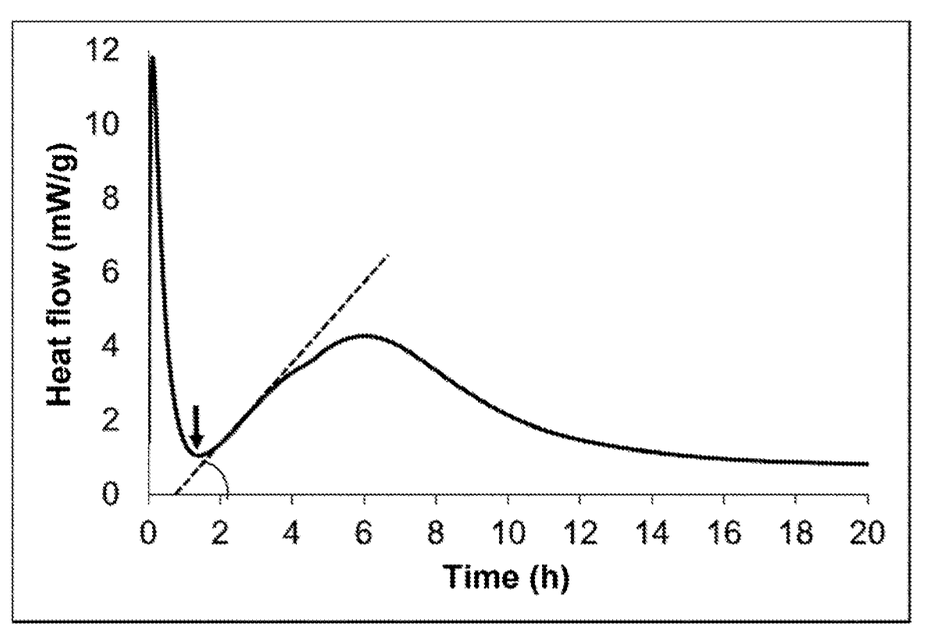
FIG. 1 shows: graph of the development over time of the heat of hydration.

FIG. 1 depicts the graph of the development over time of the heat of hydration of a cement paste, measured by isothermal heat flow calorimetry. The arrow marks the start of setting, and the interrupted line marks the rise in the curve, with a rise angle drawn in.

EXAMPLES

Set out below are working examples which are intended to illustrate the invention described in more detail. The invention is of course not confined to these working examples described.

"Ex." stands for "Example"

"Ref." stands for "Reference example"

1. Description of the Measurement Methods

Particle size by HELOS: The particle size of the calcium hydroxide suspensions was determined by laser diffraction. The instrument used for the measurement was the HELOS, equipped with the Quixel dispersing unit, both from Sympatec, Germany. The instrument captures particle sizes from 0.10 to 8750 μm. For the measurements, the suspensions were diluted with saturated calcium hydroxide solution.

Particle size by Nanophox: The particle size of the calcium hydroxide nanoparticles was determined by dynamic light scattering with photon cross-correlation spectroscopy. The instrument used for the measurement was the Nanophox from Sympatec GmbH, Germany. The instrument captures particle sizes from 0.5 to 10 000 nm. There is no need for the sample to be diluted. Prior to the measurement, the sample was homogenized with an ultrasound probe for one minute.

The storage stability of the suspensions was determined as follows:

In a centrifuge (Heraeus™ Biofuge Primo R from Thermo Scientific™), fitted with a rotor with fixed angles of 45°, 50 ml of each of the fresh and thoroughly stirred suspensions were introduced into Falcon® centrifuge tubes (50 ml) with screw closure and centrifuged at 8000 revolutions per minute for 15 minutes at 23° C. The top 40 ml were then removed from the centrifuge tube, and their turbidity was ascertained.

The turbidity was determined nephelometrically (90°) in accordance with US EPA 180.1. The instrument used for this purpose was a HACH® 2100AN turbidimeter from HACH®, Germany, with a tungsten light source and the unit NTU (Nephelometric Turbidity Unit).

The hydration behavior of the cement pastes was measured using isothermal heat flow calorimetry. The instrument used for this purpose was the TAM Air from TA Instruments, USA. The development of the heat of hydration over time in comparison to a cured cement reference sample was measured. The timespan between the mixing of the cement with water until the first increase in the heat flow after attainment of the first minimum is rated as the time to the start of setting.

To determine the angle of rise of the heat flow curve, a tangent was placed at the turning point of the curve section located between the start of setting and the next maximum. The angle formed by the tangent with the horizontal axis is rated as the angle of rise of the heat flow curve. The angle of rise is a measure of the rate of the hydration reaction. The faster the reaction, the steeper the rise and the larger the angle.

A typical heat flow curve and its evaluation are represented in FIG. 1.

The slump of the mortar mixtures was determined in accordance with EN 1015-3.

Start of setting and end of setting of the mortar mixtures were ascertained by measuring the temperature in the course of the time after mixing with water. The temperature measurement took place with a thermocouple as temperature sensor on a mortar sample which was stored in an isolated vessel in a room conditioned at 20° C.

For these examples, the start of setting is the time elapsed between the mixing with water to the time of the rise in the temperature curve after the induction phase (i.e., rest phase).

The end of setting for these examples is the time elapsed between the mixing with water to the attainment of the temperature maximum occurring after the induction phase.

The compressive strength of the cured mortars was determined on mortar prisms of 4×4×16 cm. For this purpose, the fresh mortar was introduced into corresponding molds and stored at 20° C. After 8 and 24 hours, a determination was made of the compressive strength of the mortar prisms in according with EN 196-1.

2. Materials Used

Polymer P1 is an aqueous solution of a comb polymer which consists of acrylic acid units and polyethylene glycol methacrylate units (Mw of the polyethylene glycol: 5000 g/mol) in a molar ratio of 15:1 and has a solid content of 32 weight %. Sika® ViscoCrete®-20 HE (VC 20 HE) is an aqueous solution of a superplasticizer based on a modified polycarboxylate, available from Sika Schweiz AG, Switzerland.

SikaRapid®-1 is a hardening accelerator, available from Sika Schweiz AG, Switzerland.

SikaRapid® C-100 is a hardening accelerator, available from Sika Schweiz AG, Switzerland.

Emsure® ACS is a calcium hydroxide powder, available from Merck KGaA, Germany.

Verit Natur is a white lime hydrate with at least 93 weight % of the particles <90 μm and a Blaine value of 20 000 m²/g (information from the product datasheet), available from Schretter and Cie GmbH & Co KG, Austria.

Zement CEM I 42.5 N is a Portland cement, available from Jura-Cement-Fabriken AG, Switzerland.

Zement CEM I 52.5 R is a Portland cement, available from Holcim Schweiz under the trade name Normo 5R.

3. Aqueous Calcium Hydroxide Suspensions

Production of Suspensions S1 and S2

In a beaker, 30.0 g of polymer P1 were dissolved in 335.2 g of water, after which, with vigorous stirring using a propeller stirrer, 54.7 g of calcium hydroxide powder were scattered in, and then the sodium nitrate was dissolved in the suspension. As soon as the stirrer was shut off, part of the calcium hydroxide settled on the bottom of the stirring vessel.

The suspensions S1 and S2 had the compositions and properties reported in table 1.

Production of Suspension S3

Suspension S3 was produced like suspension S2, but the sodium nitrate added was replaced by the same amount by weight of water. As soon as the stirrer was shut off, part of the calcium hydroxide settled on the bottom of the stirring vessel. The suspension S3 had the composition and properties reported in table 1.

Production of Suspension S4

Calcium nitrate solution: 174.4 g of $Ca(NO_3)_2 \cdot 4H_2O$ (0.739 mol) were dissolved in 62 g of hot water (45° C.) and then 30 g of polymer P1 were dissolved in the solution.

Sodium hydroxide solution: 59.1 g of NaOH (1.478 mol) were dissolved with cooling in 220 g of water.

The calcium nitrate solution was charged to a 1 liter round-bottom flask. With stirring using a propeller stirrer, the sodium hydroxide solution was added via a dropping funnel over the course of 5 minutes. The resulting suspension was stirred for a further 60 minutes.

The suspension S4 had the composition and properties reported in table 1.

Production of Suspension S5

The solutions used were the same as those described for suspension S4. In this example, however, both solutions were metered simultaneously into a continuous reactor, and mixing took place with high mixing intensity in a short mixing time. The resulting suspension was discharged continuous from the reactor.

The suspension S5 had the composition and properties reported in table 1.

Production of Suspension S5-UF

Suspension S5 was purified by ultrafiltration using a polyethersulfone membrane having a 30 KDa size exclusion limit. In this procedure, the $NaNO_3$ was removed and the suspension was concentrated. Thereafter the suspension was diluted with saturated calcium hydroxide solution so as to give 10 g of calcium hydroxide in 100 g of the suspension.

Production of Suspension S5-2

The production of suspension S5-UF was repeated, but at the dilution stage $NaNO_3$ was also added, in a quantity such that there were 10 g of calcium hydroxide and 23 g of $NaNO_3$ in 100 g of the suspension.

The compositions in weight % and also the properties of suspensions S1 to S5 are reported in table 1.

TABLE 1

|  | Ref. 1 | Ref. 2 | Ref. 3 | Ref. 4 | Ex. 1 |
|---|---|---|---|---|---|
|  | S1 | S2 | S3 | S4 | S5 |
| Calcium hydroxide type | Emsure® ACS | Verit Natur | Verit Natur | From precipitation reaction | From precipitation reaction |
| Composition in weight % | | | | | |
| Water | 65.2 | 65.2 | 88.2 | 65.2 | 65.2 |
| Calcium hydroxide | 10.0 | 10.0 | 10.0 | 10.0 | 10.0 |
| $NaNO_3$ | 23.0 | 23.0 | 0 | 23.0 | 23.0 |
| Polymer P1** | 1.8 | 1.8 | 1.8 | 1.8 | 1.8 |
| Turbidity of the upper phase after centrifuging | | | | | |
| Turbidity (NTU) | 256 | 291 | n.m.* | 227 | 9614 |
| Particle size with HELOS (μm) | | | | | |
| D10 | 0.78 | 0.8 | n.m.* | 0.41 | 0.17 |
| D50 | 2.42 | 3.0 | n.m.* | 2.9 | 0.50 |
| Particle size with Nanophox (nm) | | | | | |
| D10 | n.m.* | n.m.* | n.m.* | n.m.* | 140 |
| D50 |  |  |  |  | 163 |
| D90 |  |  |  |  | 192 |

*not measured
**calculated without water, pure solid

4. Utility Tests 4.1 Test in Cement Paste 32.4 g of water and 4 g of the aqueous suspension as per table 2 and 3 were added to 100 g of CEM I 42.5 N cement and mixing was carried out for 2 minutes using a mechanical stirrer. The development of the heat of hydration was then measured.

For the comparison without admixtures (Ref. 5 and Ref. 11), 100 g of cement were mixed with 35 g of water in the same way.

For the comparison with $NaNO_3$ as sole admixture (Ref. 6), 0.92 g of $NaNO_3$ was dissolved in 35 g of water and mixed with the cement as described above.

The evaluations of the measurements of the heat of hydration are reported in table 2 and 3.

TABLE 2

|  | Ref. 5 | Ref. 6 | Ref. 7 | Ref. 8 | Ref. 9 | Ref. 10 | Ex. 2 |
|---|---|---|---|---|---|---|---|
| Admixture | none | $NaNO_3$ | S1 | S2 | S3 | S4 | S5 |
| Start of setting (h:min) | 1:40 | 1:30 | 1:43 | 1:36 | 1:35 | 1:44 | 1:25 |
| Angle of rise of the heat flow curve (°) | 40 | 45 | 48 | 48 | 45 | 48 | 53 |

TABLE 3

|  | Ref. 11 | Ex. 3 | Ex. 4 | Ex. 5 |
|---|---|---|---|---|
| Admixture | none | S5 | S5-UF | S5-2 |
| Start of setting (h:min) | 1:30 | 1:21 | 1:25 | 1:21 |
| Angle of rise of the heat flow curve (°) | 34 | 48 | 45 | 48 |

When comparing the results from table 2 and table 3, especially Ref. 5 and Ref. 11 and also Ex. 2 and Ex. 3, it should be borne in mind that the experiments described in table 2 and in table 3 were carried out at different points in time and with different cement supplies. Cements with different ages and from different batches are subject to fluctuations which may influence the measurement values. Within each measurement series (measurement series in table 2 and measurement series in table 3, respectively), however, the cement used was the same.

4.2 Test in Mortar Mixtures

Mortar Series 1

In a forced mixer from Hobart, 750 g of CEM I 52.5 R cement, 141 g of limestone filler, 738 g of 0-1 mm sand, 1107 g of 1-4 mm sand and 1154 g of 4-8 mm sand were mixed dry for 1 minute. Then 292.5 g of a mixture of water and the admixtures reported in table 4 were added to the dry mortar mixture in the mixer over the course of 30 seconds, with stirring, and the mortar was mixed for a further 2.5 minutes. The total wet mixing time lasted 3 minutes in each case. The level of metered addition of the admixtures, the slump, and also the setting time of the mortar mixtures are reported in table 4.

TABLE 4

| | | Slump (in mm) | | | | Setting time (h:min) | |
|---|---|---|---|---|---|---|---|
| Admixture | Met.[1] | 0 min. | 30 min. | 60 min. | 90 min. | start | end |
| Ref. 12 | VC 20 HE[2] | 1 | 257 | 257 | 247 | 171 | 3:40 | 12:30 |
| Ref. 13 | VC 20 HE SikaRapid ®-1 | 1 1 | 233 | 226 | 184 | 135 | 3:15 | 9:50 |
| Ref. 14 | VC 20 HE SikaRapid ® C-100 | 1 1 | 270 | 248 | 194 | 128 | 3:00 | 9:50 |
| Ex. 6 | VC 20 HE S5 | 1 2 | 268 | 262 | 241 | 174 | 2:40 | 9:50 |

[1] level of metered addition in weight % of solution or suspension to cement
[2] Sika ® ViscoCrete ®-20 HE
[3] not measured, mixture too stiff Mortar Series 2

Mortar mixtures as described in mortar series 1 were produced. In this series, however, 300 g of a mixture of water and the admixtures as per table 5 were used. The level of metered addition of the admixtures, the slump, and also the compressive strength of the mortar mixtures are reported in table 5.

TABLE 5

| | | Slump (in mm) | | | | Compressive strength (N/mm²) | |
|---|---|---|---|---|---|---|---|
| Admixture | Met.[1] | 0 min. | 30 min. | 60 min. | 90 min. | 8 hours | 24 hours |
| Ref. 15 | VC 20 HE[2] | 1 | 240 | 220 | 171 | 114 | 5.4 | 48.7 |
| Ex. 7 | VC 20 HE S5 | 1 2 | 249 | 218 | 165 | 116 | 7.9 | 53.8 |

[1] level of metered addition in weight % of solution or suspension to cement
[2] Sika ® ViscoCrete ®-20 HE In a comparison of the results in table 4 and table 5, especially of Ref. 12 and Ref. 15, it should be borne in mind that the mortar tests were carried out in different measurement series and on different dates. Cements of different ages and sands from different batches are subject to fluctuations which may influence the measurement values. Within each measurement series (measurement series in table 4 and measurement series in table 5, respectively), however, the cement and the sands used were always the same.

The invention claimed is:

1. A method for producing an aqueous suspension, comprising: (a) providing an aqueous solution A comprising at least 5 weight % of a water-soluble calcium salt, (b) providing an aqueous solution B comprising at least 5 weight % of an alkali metal hydroxide, (c) metering solution A and solution B simultaneously into a continuous reactor and contacting solution A and solution B such that solution A and solution B are mixed rapidly and intensely to form a suspension, wherein the rapid and intense mixing of the solution A and the solution B takes place continuously and a mixing time is below 1 minute, wherein the solution A and solution B are metered under pressure of at least 5 bar into the continuous reactor by means of pumps, wherein the pressure and a resulting velocity of the solution A and the solution B on introduction into the continuous reactor produces the rapid and intense mixing, and (d) discharging the suspension from the continuous reactor, where a compound for stabilizing the suspension is added to the solution A, to the solution B or to both solutions, or to the suspension produced, wherein the suspension includes calcium hydroxide in the form of nanoparticles having a particle size D90 of below 800 nm, measured by dynamic light scattering with photon cross-correlation spectroscopy, and wherein the suspension is free from calcium silicate hydrate.

2. The method as claimed in claim 1, wherein the compound for stabilizing the suspension is a comb polymer and comprises structural units of formula I and structural units of formula II, (I)

(II)

where:
R$^1$, in each case independently of one another, is —COOM, —SO$_2$—OM, —O—PO(OM)$_2$, —PO(OM)$_2$, —(CO)—NH—C(CH$_3$)$_2$—CH$_2$—SO$_3$M, —CH$_2$—SO$_3$M, =

R$^2$, in each case independently of one another, is H, —CH$_2$COOM or an alkyl group having 1 to 5 carbon atoms, R³, R⁵ and R⁶, in each case independently of one another, are H or an alkyl group having 1 to 5 carbon atoms, R⁴ and R⁷, in each case independently of one another, are H, —COOM or an alkyl group having 1 to 5 carbon atoms, M, independently of one another, represents H⁺, an alkali metal ion or an alkaline earth metal ion;

m is 0, 1 or 2, p is 0 or 1,

X, in each case independently of one another, is —O—, NH— or —NR⁸—, and

R⁸ is a group of the formula -[AO]$_n$—R$^a$, where A is a $C_2$ to $C_4$ alkylene, R$^a$ is H or a $C_1$ to $C_{20}$ alkyl, cyclohexyl or alkylaryl group, and n is 1 to 250.

3. The method as claimed in claim 1, wherein the suspension comprises 0.01 to 2.5 mol of an alkali metal salt based on 1 mol of calcium hydroxide.

4. The method as claimed in claim 1, wherein the water-soluble calcium salt is selected from the group consisting of calcium nitrate, calcium chloride, calcium acetate, calcium formate, calcium thiocyanate, or a mixture thereof.

5. The method as claimed in claim 1, wherein the water-soluble calcium salt is calcium nitrate.

6. The method as claimed in claim 1, wherein the aqueous solution A contains the calcium salt in an amount within a range of 10 to 87 weight %.

7. The method as claimed in claim 1, wherein the aqueous solution A contains the calcium salt in an amount within a range of 20 to 80 weight %.

8. The method as claimed in claim 1, wherein the aqueous solution B comprises the alkali metal hydroxide in an amount in a range of 20 to 40 weight %.

9. The method as claimed in claim 1, wherein the alkali metal hydroxide is sodium hydroxide.

10. The method as claimed in claim 1, wherein the aqueous solution A and the aqueous solution B are metered into the continuous reactor such that a molar ratio of calcium salt to alkali metal hydroxide is in a range of 1:2.0 to 2.4:1.

11. The method as claimed in claim 1, wherein the mixing time is below 30 seconds.

12. The method as claimed in claim 1, wherein the mixing time is below 1 second.

13. The method as claimed in claim 1, further comprising concentrating the suspension to increase a solids content by removal of water.

14. The method as claimed in claim 1, further comprising cleaning the suspension to remove auxiliaries or byproducts by means of ion exchange, filtration, or ultrafiltration.

15. The method as claimed in claim 1, wherein a mixing energy with which the solution A and the solution B are rapidly and intensely mixed is not more than 200 kJ per kilogram of calcium hydroxide suspension produced.

\* \* \* \* \*